(12) United States Patent
Ruiz et al.

(10) Patent No.: US 12,621,163 B2
(45) Date of Patent: May 5, 2026

(54) METHOD AND DEVICE FOR CONTROLLING ACCESS TO A RESOURCE

(71) Applicant: NAGRAVISION SÀRL, Cheseaux-sur-Lausanne (CH)

(72) Inventors: Luis Ruiz, Cheseaux-sur-Lausanne (CH); Didier Hunacek, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 94 days.

(21) Appl. No.: 18/261,073

(22) PCT Filed: Dec. 16, 2021

(86) PCT No.: PCT/EP2021/086340
§ 371 (c)(1),
(2) Date: Jul. 11, 2023

(87) PCT Pub. No.: WO2022/152500
PCT Pub. Date: Jul. 21, 2022

(65) Prior Publication Data
US 2024/0064026 A1 Feb. 22, 2024

(30) Foreign Application Priority Data
Jan. 13, 2021 (EP) ..................................... 21151382

(51) Int. Cl.
*H04L 9/32* (2006.01)
*G06F 21/72* (2013.01)
(52) U.S. Cl.
CPC ............ *H04L 9/3247* (2013.01); *G06F 21/72* (2013.01); *H04L 9/3242* (2013.01)

(58) Field of Classification Search
CPC ....... H04L 9/10; H04L 9/3242; H04L 9/3247; H04L 2209/127; G06F 21/51; G06F 21/57; G06F 21/64; G06F 21/72; G06F 21/76
See application file for complete search history.

(56) References Cited

U.S. PATENT DOCUMENTS 8,423,789 B1 * 4/2013 Poo .......................... G06F 21/70
713/193
10,878,099 B2 * 12/2020 Wu ...................... G06F 9/30098
(Continued)

OTHER PUBLICATIONS

International Search Report and Written Opinion mailed on Apr. 7, 2022 in PCT/EP2021/086340 filed on Dec. 16, 2021 (13 pages).
(Continued)

*Primary Examiner* — Eric W Shepperd
(74) *Attorney, Agent, or Firm* — POLSINELLI LLP

(57) ABSTRACT

A method for controlling access to a resource in an electronic device including a secure element with a permanent memory having an OTP area. The method includes the following steps performed first when the secure element or the electronic device boots: checking presence of at least one of a secret data and an initialization value in the permanent memory and, in a negative event, generating an initialization value and storing it into the OTP area, in a positive event, if the permanent memory includes secret data, decrypting, within the secure element, the secret data by using an algorithm using a cryptographic key and, if the permanent memory further includes an initialization value, the initialization value, and checking the integrity of the secret data by using a signature stored in the permanent memory and, on successful completion, providing access to the resource.

20 Claims, 4 Drawing Sheets

(56)     References Cited

U.S. PATENT DOCUMENTS

| | | | | |
|---|---|---|---|---|
| 2011/0010720 | A1* | 1/2011 | Smith | G06F 21/00 |
| | | | | 712/E9.016 |
| 2016/0293268 | A1* | 10/2016 | Jan | G11C 17/18 |
| 2017/0093586 | A1* | 3/2017 | Miranda | H04L 9/3268 |
| 2017/0329538 | A1* | 11/2017 | Benoit | G06F 21/51 |
| 2018/0034625 | A1 | 2/2018 | Hunacek et al. | |
| 2018/0136274 | A1* | 5/2018 | Yin | H01L 24/82 |
| 2019/0044715 | A1 | 2/2019 | Hunacek | |
| 2019/0278364 | A1* | 9/2019 | Rowley | G06F 12/0238 |
| 2021/0004495 | A1* | 1/2021 | Osugi | H04L 9/0618 |
| 2021/0021192 | A1* | 1/2021 | Hauke | H02M 3/3385 |
| 2022/0011441 | A1* | 1/2022 | Kaufmann | G01S 19/23 |

OTHER PUBLICATIONS

European Search Report dated Jun. 17, 2021 in EP Application 21151382.5 filed on Jan. 13, 2021 (7 pages).

* cited by examiner

METHOD AND DEVICE FOR CONTROLLING ACCESS TO A RESOURCE

TECHNICAL FIELD

The present disclosure relates to the field of secure access provided by electronic devices for hardware or software resources. Such accesses are typically linked to sensitive or conditional services, such as those provided in the Pay-TV (television) field for example. The present disclosure is more specifically applicable to chips or chipsets provided with programmable secrets, such as chipsets with programming key slots. In such a context, a method based on secret data for controlling access to a resource and an electronic device for implementing this method is disclosed hereafter.

BACKGROUND

When a chipset must be programmed with secret data, it is generally done at a wafer level, i.e. at the level of the thin slice of the semiconductor or its substrate. Such an operation takes times and is costly. Chipsets made by manufacturers for specific devices, such as decoders in the Pay-TV field, are provided with secret data stored e.g. in a one-time-programmable area (OTP area) which is a memory area that may be specifically reserved for this purpose. However, some manufacturers do not program such secret data, either through negligence or to offer the same chipsets to interested third parties for integration into parallel solutions. Indeed, it is common for the same chipset to be used by more than one company that develops conditional access systems. Accordingly, the same chipset may be used for several companies but it will generally be configured differently from one company to another.

Secret data typically refers to decryption keys or key files required for getting access to some products or services proposed to customers or client devices dependent on conditional access solutions. Within chipsets manufacturers, these secrets are usually stored in plain text (i.e., in an unencrypted form) inside so-called black-boxes which are kinds of slightly protected servers. Since they have to be loaded in the related programming key slots during the manufacturing process, these secrets are necessarily known by the manufacturers.

Therefore, there is a risk that unprogrammed chipsets, having an untouched OTP area, are recovered for fraudulent purposes. For instance, a malicious person within the chipset manufacturer may have access to unprogrammed chipsets with untouched OTP area, as well as to secret data issued from a black-box. Therefore, such a person will have everything needed to make a clone of the original chipset programmed with those secret data.

According to another scenario, unprogrammed chipsets with untouched OTP areas could be acquired via a fraudulent market since some manufacturers legally provide some of their clients with such chipsets. Hackers could undertake physical attacks onto authentic chipsets programmed with secret data. In case of successful attacks, such hackers could copy the secret data into unprogrammed chipsets in order to clone the authentic chipsets. Accordingly, there is still a risk for a company that develops conditional access systems on basis of such chipsets to be copied by scammers using illegal approaches.

To overcome such issues, one solution may consist of preventing external access to the OTP area designed to receive secret data. Indeed, if a chipset does not need to be loaded with secret data, e.g. because it is designed to be used for purposes other than conditional accesses, the access to the OTP area from outside the chipset could be prevented by burning a component acting as a fuse for example. However, some manufacturers refrain from burning the programming key slots because some of their clients prefer to load secret data themselves or do it through another channel.

Besides, the fact that the OTP area of chipsets remains accessible, i.e. is kept in a dormant state, even when it is not programmed, remains interesting for a company making conditional access solutions. Indeed, such a company may have an interest to legally recover these chipsets from a third company, for example in the event of a company takeover or merger. However, if the recovered chipsets comprise burned empty key slots or burned OTP areas, it should be aware that no subsequent programming is then possible. In this case, there is no interest for such a company to recover unprogrammed chipsets into which it is no longer possible to load secret data.

Accordingly, there is a need for an efficient and reliable solution to at least partially overcome the aforementioned issues and drawbacks. More specifically, such a solution preferably must be able to avoid having to burn untouched OTP areas designed to store secret data if the latter have not been loaded into the chipset, and prevent that such areas can be subsequently loaded with secret data after the chipset manufacturing process. Therefore, this solution should be able to efficiently prevent hackers getting replications of chipsets provided with valuable secret data from unprogrammed chipsets provided with a virgin OTP area.

SUMMARY OF THE SOLUTION

To address this concern, the present disclosure suggests, as a first aspect, a method for controlling access to a resource in an electronic device, said electronic device, comprising a secure element linked with a permanent memory having a one-time programmable area, said method comprising the following steps, performed first when the secure element or the electronic device boots:

checking a presence of at least one of a secret data and an initialization value in the permanent memory and in a negative event, generating an initialization value and storing it into the one-time programmable area, in a positive event, and if the permanent memory includes secret data, decrypting, within the secure element, the secret data by using an algorithm using a cryptographic key and, if the permanent memory further includes an initialization value, the initialization value, checking the integrity of the secret data by using a signature stored in the permanent memory and, on successful completion, providing access to the resource.

Thanks to the present solution, if no secret data and/or or no initialization value have been programmed during the manufacturing process of the chipset, the latter will automatically generate and store an initialization value in the OTP area as first operation made when it is powered. Since, the decryption process of the algorithm is configured to use the cryptographic key and, if any, the initialization value, this value becomes a parameter that has to be taken into account during the decryption of the secret data stored in the permanent memory. Therefore, copying encrypted secret data into the permanent memory from an original chipset in an attempt to clone it becomes useless because the encryption of the original secret data was not necessarily made on the basis of an initialization value and even if an initialization value was used at the origin, there is almost no chance to guess which value was initially used.

On the other hand, only the entity which has programmed the secure element with the algorithm and the cryptographic key is able, with any imposed initialization value, to recalculate the appropriate secret data or encrypted secret data that has to be stored in the permanent memory after the initialization value is stored in the OTP area. Therefore, the chipset can be advantageously recovered for a subsequent use for such an entity only.

Preferably, at least one of the secret data and the signature is stored in the one-time programmable area.

In one embodiment, the cryptographic key is an obfuscated cryptographic key. Preferably, the cryptographic key is scattered within a source data set, still preferably within the algorithm.

According to a preferred embodiment, the cryptographic key is a global key which is common and integrated into a plurality of electronic devices at a manufacturing stage. Preferably, the secret data is encrypted using a personal key and the method further comprises a step for deriving said personal key from the global key and, if any, from the initialization value.

In a preferred embodiment, the algorithm is a proprietary or custom algorithm which is kept secret.

According to another embodiment, the initialization value is generated in a random way and/or stored in plain text within the one-time programmable area.

In one embodiment, said secret data is, if any, stored during a manufacturing stage of the electronic device.

According to a further embodiment, the step checking the presence is preceded by a step of testing, by a selector, a condition whether the electronic device is for a specific company or market and, if the electronic device is not for a specific company or market, the step of checking is executed, and, if the electronic device is for a specific company or market, the step of checking is skipped.

According to a second aspect, the present disclosure also relates to an electronic device for controlling access to a resource according to the above-mentioned method which can be executed according to any of its embodiments or according to any possible combination of these embodiments. Said electronic device comprising at least a secure element linked with a permanent memory having a one-time programmable area, characterized in that the secure element hosts an algorithm with a cryptographic key and is configured to:

first, when the secure element or the electronic device boots, check a presence of at least one of a secret data and an initialization value in the permanent memory and, in a negative event, generate an initialization value and store it into the one-time programmable area, in a positive event, and if the permanent memory includes secret data, decrypt the secret data thanks to said algorithm using the cryptographic key and, if the permanent memory further includes an initialization value, the initialization value, check the integrity of the secret data thanks to a signature stored in the permanent memory and, on successful completion, provide access to the resource.

In one embodiment, the electronic device is devoid of any protective hardware able to prevent access to the permanent memory other than by the secure element. According to another embodiment, the electronic device further comprises a selector configured to determine, before a first-ever boot of the secure element or the electronic device, whether checking the presence of secret data or of the initialization value and, if applicable, generating and storing the initialization value must be skipped.

Preferably, the electronic device constitutes a system on a chip.

Other embodiments and advantages will be disclosed in the detailed description.

BRIEF DESCRIPTION OF THE DRAWINGS

The solution and the embodiments suggested in the present disclosure should be taken as non-limitative examples and will be better understood with reference to the attached figures in which.

DETAILLED DESCRIPTION

Figure 1:
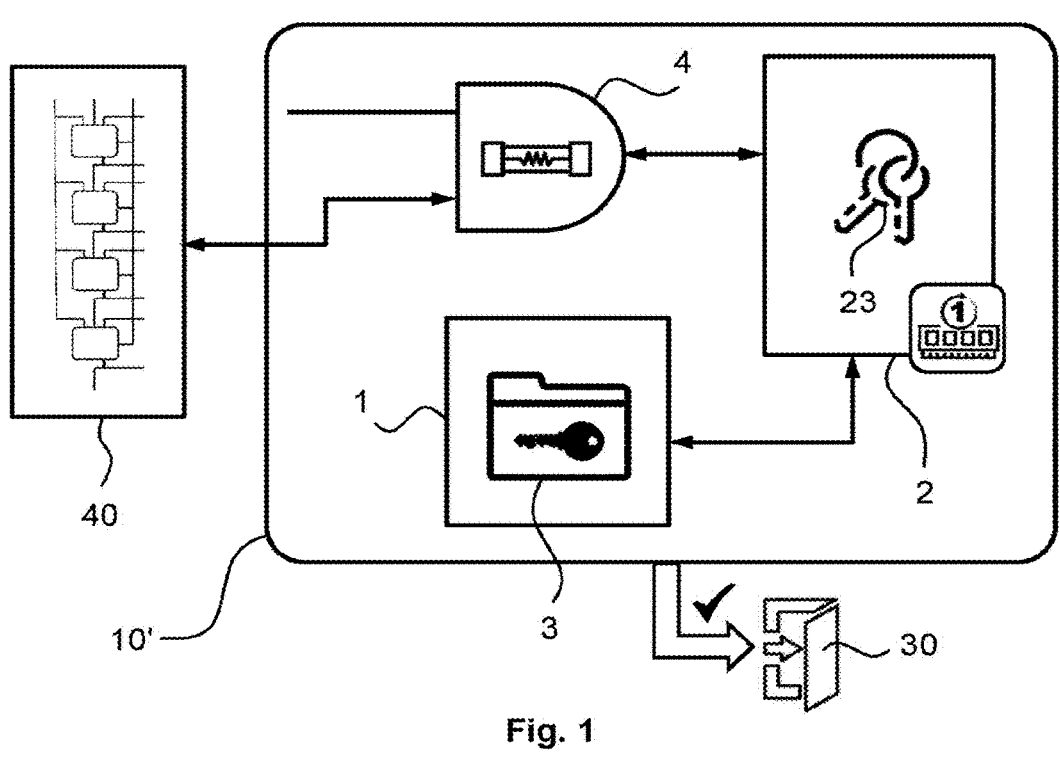
FIG. 1 shows a known electronic device commonly used for controlling access to a resource according to the prior art.

FIG. 1 shows a known electronic device 10' commonly used for controlling access to a resource 30 according to the prior art. Typically, this known electronic device 10' comprises a secure element 1 linked to a permanent memory 2, as shown in FIG. 1 by the double arrow linking these two devices. The secure element 1 comprises cryptographic data 3 which are usually required to get access to secret data 23 stored in the permanent memory 2. The latter is preferably a one-time programmable (OTP) memory, namely a special type of non-volatile memory that allows data to be written only once.

From outside the electronic device 10', the access to the permanent memory 2 passes through a fuse 4, which is therefore the single way to program the secret data 23 into the permanent memory 2. To this end, a scan chain 40 is commonly used for programming the secret data into the memory as well as for testing the electronic device 10' at a manufacturing stage. The scan chain comprises a plurality of scan flip-flops linked to each other so as to form a chain. Each scan flip-flop is a D flip-flop (i.e. a data or delay flip-flop) that allows its input to come from an alternative source. The technique provided by the scan chain makes testing easier by providing a simple way to set and observe every flip-flop in an integrated circuit.

The fuse 4 is a hardware device that prevents anyone from being able to re-read the OTP memory once the electronic device 10' is, for example, programmed at the end of the manufacturing stage. The fuse 4 disables any attempt to read or write the permanent memory from outside the electronic device once this device is programmed. Therefore, using e.g. a scan chain 40 to read or modify the permanent memory would remain impossible once the fuse 40 has been activated or broken. Accordingly, the fuse 4 is an efficient device to protect secret data from being read or modified in the permanent memory.

If the electronic device 10' is used for different purposes which do not require storing secret data in the permanent memory, it may be advisable to burn the fuse 4 in order to prevent any re-use of such an electronic device by malicious persons, e.g. seeking to clone an original by copying secret data. However, once the fuse has been used (burned), there is no longer possibility to program any secret data in the permanent memory 2. This means that there is either no possibility for a company to retrieve the electronic device 10' if it had been designed for a market where no secret data was needed so that the fuse had been burnt out.

Figure 2:
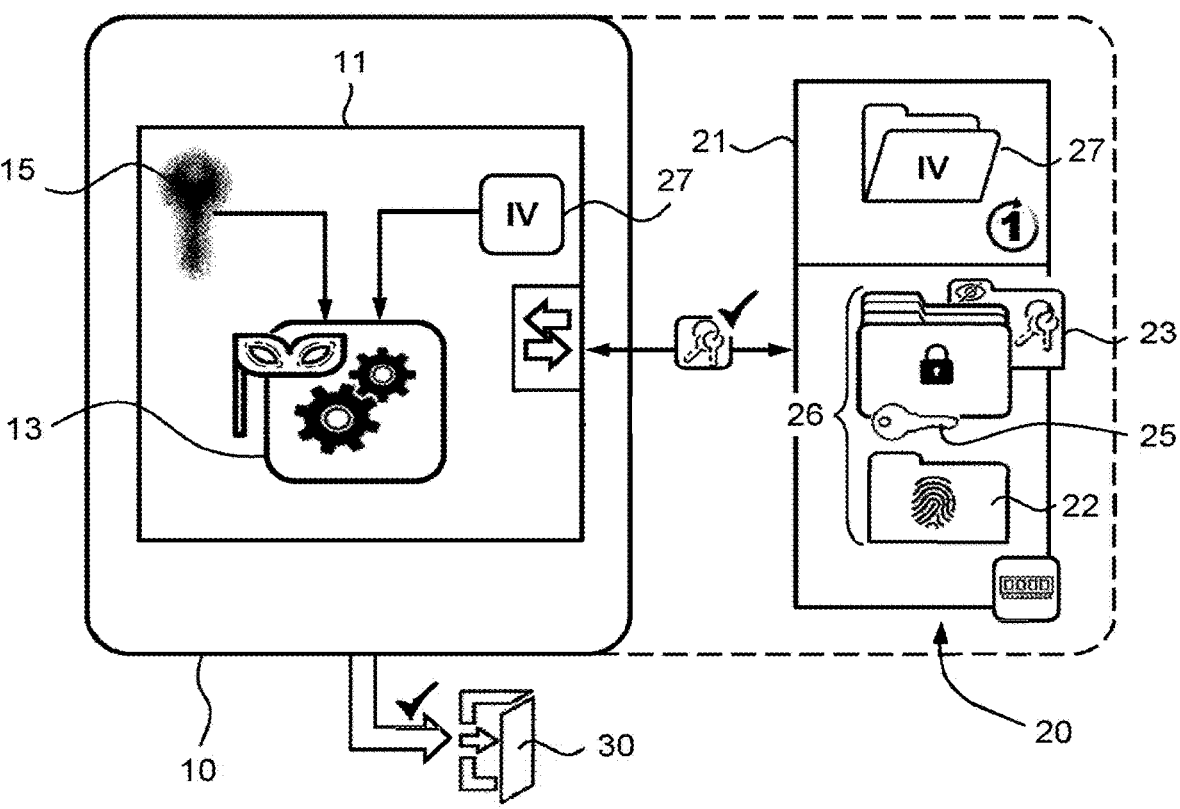
FIG. 2 is an example of a typical environment in which the present method may be implemented while showing the main entities involved therein.

To overcome this issue, the solution suggested in the present disclosure first suggests a method that may be implemented in an electronic device 10 as schematically depicted in the overview provided by FIG. 2. This electronic device 10 may be a chip, a chipset, an integrated circuit, an intellectual property block, a smartcard or any other electronic device suitable for implementing at least the steps of the present method. This electronic device 10 comprises a secure element 11 linked with or connected to a permanent memory 20 having a one-time programmable (OTP) area 21. The secure element may be regarded as a hardware secure bloc or a trusted execution environment (TEE), namely a secure area inside a main processor. In addition, and as schematically shown through the dashed line, the permanent memory 20 may be located inside or outside the electronic device 10. Nevertheless, the permanent memory 20 is preferably located inside the electronic device in order to ensure that it cannot be replaced by another memory for example. The permanent memory may comprise at least one OTP area 21 or may consist of an OTP area. In the preferred embodiment, the permanent memory is divided into at least two parts so that one of them is an OTP area 21, as shown in FIG. 2.

Figure 3:
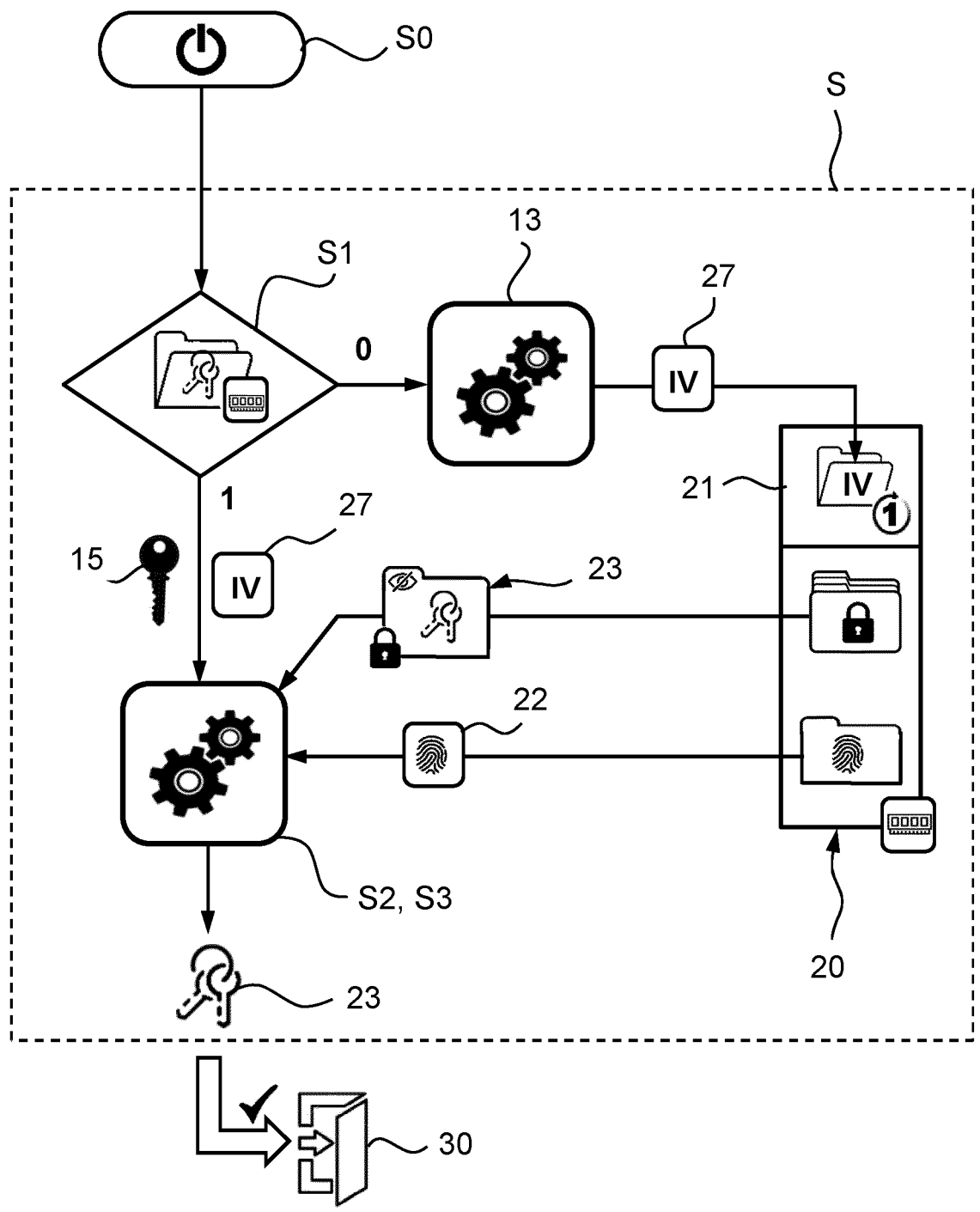
FIG. 3 depicts a flowchart of the method of the present solution.

The main steps of the present method are depicted in the flowchart of FIG. 3 as follows:

The first main step S1 aims to check the presence of secret data 23 or of an initialization value 27 in the permanent memory 20. It should be noted that the coordination conjunction "or" in the aforementioned expression is not an exclusive "or", so that it may means "and/or". Secret data 23 may refer to at least one secret data such as one or several decryption keys. Since it is qualified as secret, such a secret data 23 is protected against any reading from outside the electronic device 10. More specifically, secret data 23 relates to encrypted secret data so that it is stored in an unintelligible form within the permanent memory 20. In the event that main step S1 provides a negative answer (shown through the value 0 in FIG. 3), i.e. in the case that no initialization value 27 or no secret data 23 are stored in the permanent memory 20, an initialization value 27 is generated and stored into the OTP area 21. The initialization value is noted IV in the attached figures and may also be referred to as an initialization vector. In a positive event (value 1 in FIG. 3), the second main step S2 can be executed. In an embodiment, the initialization value may be randomly generated. Thus, when no initialization value and no secret data are initially stored in the permanent memory 20, an initialization value is generated and stored in the permanent memory 20 at the first main step S1. In this way, the generated initialization value, stored in the permanent memory 20, is imposed for any later use of the secure element 11 and its permanent memory 20 to control access to the resource 30. As a result, an appropriate secret data or encrypted secret data, corresponding to the generated (imposed) initialization value, has to be stored in the permanent memory 20 to use the secure element 11 for controlling access to the resource 30. In practice, only the entity which has programmed the secure element 11 (with an algorithm 13 and a cryptographic key 15 as explained below) is able, with the imposed (generated) initialization value, to calculate the appropriate secret data or encrypted secret data that has to be stored in the permanent memory after the initialization value has been generated and stored in the permanent memory 20. Therefore, the secure element 11 and its permanent memory 20 can be advantageously recovered for a subsequent use for such an entity only.

The second main step S2 aims to decrypt, within the secure element 11, the secret data 23 by using an algorithm 13. As shown in FIG. 3, this algorithm 13 uses several inputs in order to at least decrypt the secret data 23. In particular, the algorithm 13 uses at least a cryptographic key 15 and, if any, the initialization value 27. This means that if no initialization value 27 is stored in the OTP area, because secret data 27 was already programmed in the permanent memory 20 when checking its presence at the first main step S1, the algorithm 13 does not need an initialization value as additional input to decrypt the secret data 23. In such a case, only the encrypted secret data 27 and the cryptographic key 15 are needed by the algorithm 13 to properly decrypt the secret data. Preferably, the initialization value 27 is automatically made present if secret data 23 are stored in the permanent memory 20. This may typically be obtained by programming the initialization value 27 if secret data 23 has to be programmed in the permanent memory. This may be achieved by programming both the initialization value 23 and secret data 23.

Figure 4:
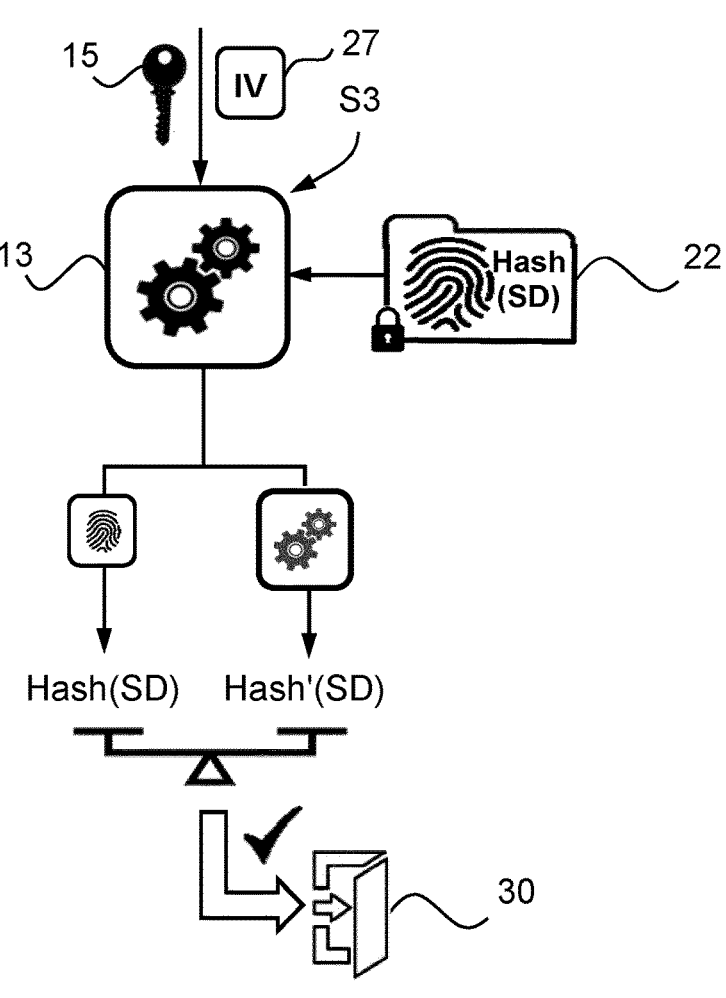
FIG. 4 shows, in more details, the steps undertaken for checking the integrity of the secret data.

The third main step S3 is better illustrated in FIG. 4 and aims to check the integrity of the secret data 23 by using a signature 22. This signature 22 is stored in the permanent memory 20, for example in the second area which is separate from the OTP area 21. Typically, storing the signature 22 is performed at the same time that the secret data 23 are stored, for example during the manufacturing process of the electronic device 10 or before this electronic device is provided or sold to a third party. The signature 22 and the secret data 23 may be placed together in a record 26 (FIG. 2) within the permanent memory 20.

Referring to FIG. 4, the third main step S3 aims to verify the signature 22. To this end, the signature 22 stored in the permanent memory 20 is read by the secure element 11, for example by being input in an algorithm which may be a dedicated algorithm or the same previously disclosed algorithm 13 if the latter is configured to both decrypt the secret data 23 and check the signature 22.

The signature 22 typically first results from a digest of the secret data 23 after having applied a so-called hash or one-way function on said secret data 23. Accordingly, the digest is also noted Hash(SD) in FIG. 4, where the abbreviation SD stands for Secret Data 23. Then, the digest is encrypted using an encryption key which may be the cryptographic key 15 of a key derived from this cryptographic key. The encryption result provides the signature 22 which may be denoted by the expression S=[Hash(SD)]K where K may be the aforementioned cryptographic key 15.

The signature 22 is verified during the checking operation performed at the main step S3. To this end, the appropriate key, such as the cryptographic key 15 for example, is used to decrypt the signature 22 so as to retrieve the digest Hash(SD). The same hash function as that previously used for generating the digest of the signature 22 is used by the secure element 11, in particular par the algorithm dedicated to check the signature, in order to calculate a second digest Hash'(SD) using the secret data 23 obtained by the algorithm 13 at the previous main step S2. As schematically depicted in FIG. 4, if the digest received Hash(SD) resulting from the signature 22 as received from the permanent memory 20 is the same as the second digest Hash'(SD) calculated by the secure element 11, the secret data 23 can be defined as being authentic or valid since the integrity of the secret data has been duly verified.

These three main steps S1, S2 and S3 are schematically depicted within the square dashed line S shown in FIG. 3. One can note that the main steps S1, S2 and S3 are executed as soon as the secure element 11 or the electronic device 10 is activated, i.e. powered or booted. Ignition of this element or device is schematically depicted through the power symbol shown at step S0. It should be also noted that the first main step S1 could be to check whether the permanent memory 20 is empty, instead of checking the presence of secret data 23, more specifically encrypted secret data 23, or of an initialization value 27. In such a case, if the permanent memory is empty, the initialization value 27 is automatically generated and stored into the OTP area 21. It should also be mentioned that the initialization value 27 is preferably generated by the algorithm 13 within the secure element 11, but could be generated by a separate or dedicated routine running e.g. within a specific unit. Besides, the cryptographic key 15 is a key that can only be read by the secure element 11. This means that any other device or channel remain unable to read the cryptographic key 15.

According to a preferred embodiment and as schematically shown in the flowchart of FIG. 3, the first main step S1 aiming to check the presence of secret data 23 or of the initialization value 27 and, if applicable, generating and storing the initialization value 27 into the OTP area 21 is performed first when the secure element 11 or the electronic device 10 boots. Therefore, thanks to this embodiment, there is no means to overpass or skip this first checking.

According to another embodiment, the secret data 23 and/or the signature 22 may be stored in the OTP area 21. If both the secret data 23 and its signature 22 are stored in the OTP area 21, the permanent memory may consist e.g. in a single one-time programmable area.

The cryptographic key 15 is preferably stored in the secure element 11 in a protected form. To this end, the cryptographic key 15 may be hidden within the secure element 11. For example, this key may be an obfuscated cryptographic key as depicted in FIG. 2. In one embodiment, the cryptographic key 15 is embedded or scattered within a source data set which may be the algorithm 13. In this case, the cryptographic key could be referred to as a so-called netlist key, namely a key which is presented in the form of a program code since program codes are also referred to as "netlists" by the person skilled in the art. A so-called netlist may be regarded as a source data set presented in the form of a code for programming device that, once programmed, will have at least one desired function or application. The code may be a high-level software language and the program code may be stored in a so-called source file. Therefore, the cryptographic key could be hidden by being scattered throughout the program code of the algorithm 13 in an exploded form. In such a case, only the designers of the program code are able to know which portion or bit of the program code belongs to the cryptographic key. Accordingly, it becomes very difficult or even impossible for a malicious person to reconstitute the cryptographic key 15 from such a program code.

According to a preferred embodiment, the cryptographic key 15 is a global key, i.e. a key which is common and integrated into a plurality of electronic devices 10, typically at the manufacturing stage. Since the cryptographic key 15 is a key that can be highly secured against potential attacks within the secure element 11, this key can advantageously be common to a huge number of electronic devices without taking undue risks. Accordingly, management of relationships between cryptographic keys and electronic devices also becomes simpler.

Figure 5:
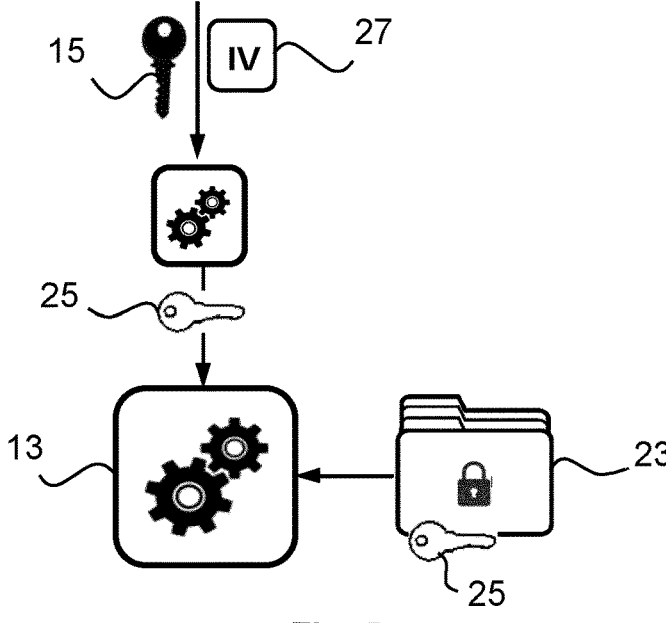
FIG. 5 depicts a variant in which a person key must be first derived to decrypt the secret data.

According to another embodiment, the secret data 23 is encrypted using a personal key 25, as schematically shown in FIG. 2. In this case, the method further comprises an additional step, undertaken e.g. between the first and second main steps S1, S2, which is depicted in FIG. 5 and aims to derive the personal key 25 from the global key (i.e. the cryptographic key 15) and, if any, from the initialization value 27. Such a derivation may be performed by the algorithm 13, e.g. a dedicated portion of this algorithm as shown in FIG. 5.

According to another preferred embodiment, the algorithm 13 is a proprietary or custom algorithm which is kept secret as schematically depicted through the mask applied on the related pictogram in FIG. 2. This means that the algorithm 13 implemented in the secure element 11 is not a common cryptographic algorithm, such as AES (Advanced Encryption Standard) or DES (Data Encryption Standard) whose operation is well known for the person skilled in the art, but is an algorithm which is customized, e.g. by specific tasks, operations, organization and/or instructions. Accordingly, and due to the fact that this proprietary algorithm 13 is kept secret, decrypting the secret data 23 stored in the permanent memory 20 becomes very tricky for a hacker, because he or she has no indication regarding the working of the algorithm 13 and has no further indication on how to recover the cryptographic key within the secure element 11.

According to one embodiment, the initialization value 27 is generated in a random way, for example using a random generator or a value-generating random function. Preferably, the initialization value 27 is stored in plain text within the permanent memory 20, in particular within the OTP area 21 of this memory. Indeed, the initialization value 27 can remain in an unencrypted form since there is no guidance in the secure element 11 to teach how and when the initialization value is to be used in the algorithm 13 for correctly decrypting the secret data 27 using the cryptographic key 15. In addition, keeping the initialization value 27 in plain text allows to simplify the work when new secret data has to be calculated, e.g. for re-using an electronic device 10 in which no secret data 27 had been stored in the permanent memory 20 because it was initially intended for a different market for instance.

In a preferred embodiment, the secret data 23 is, if any, stored during the manufacturing stage of the electronic device 10.

There could be cases where the boot sequence of the secure element 11 including the programming of the initialization value 27 in the permanent memory during the main step S1 is not performed correctly. Indeed, there are cases where it cannot be guaranteed that the electronic device 10 will not start before the programming of the secret data 23 has been done e.g. during the manufacturing process. Indeed, some manufacturers perform the programming of the permanent memory by activating the electronic device 10 instead of using a scan chain 40. If it happens whereas the manufacturer intended to program secret data 23 in the permanent memory 20, an initialization value 27 will unintentionally be generated and stored in the OTP area 21. Since the aforementioned secret data 27 were not designed to take into account such an initialization value and since the operation of the algorithm 13 is kept secret, in particular how the initialization value is processed in combination with the cryptographic key 15, encrypted secret data 27 programmed in the permanent memory without taking into account the initialization value 27 would not allow the algorithm 13 to return the appropriate secret data after decryption.

Figure 6:
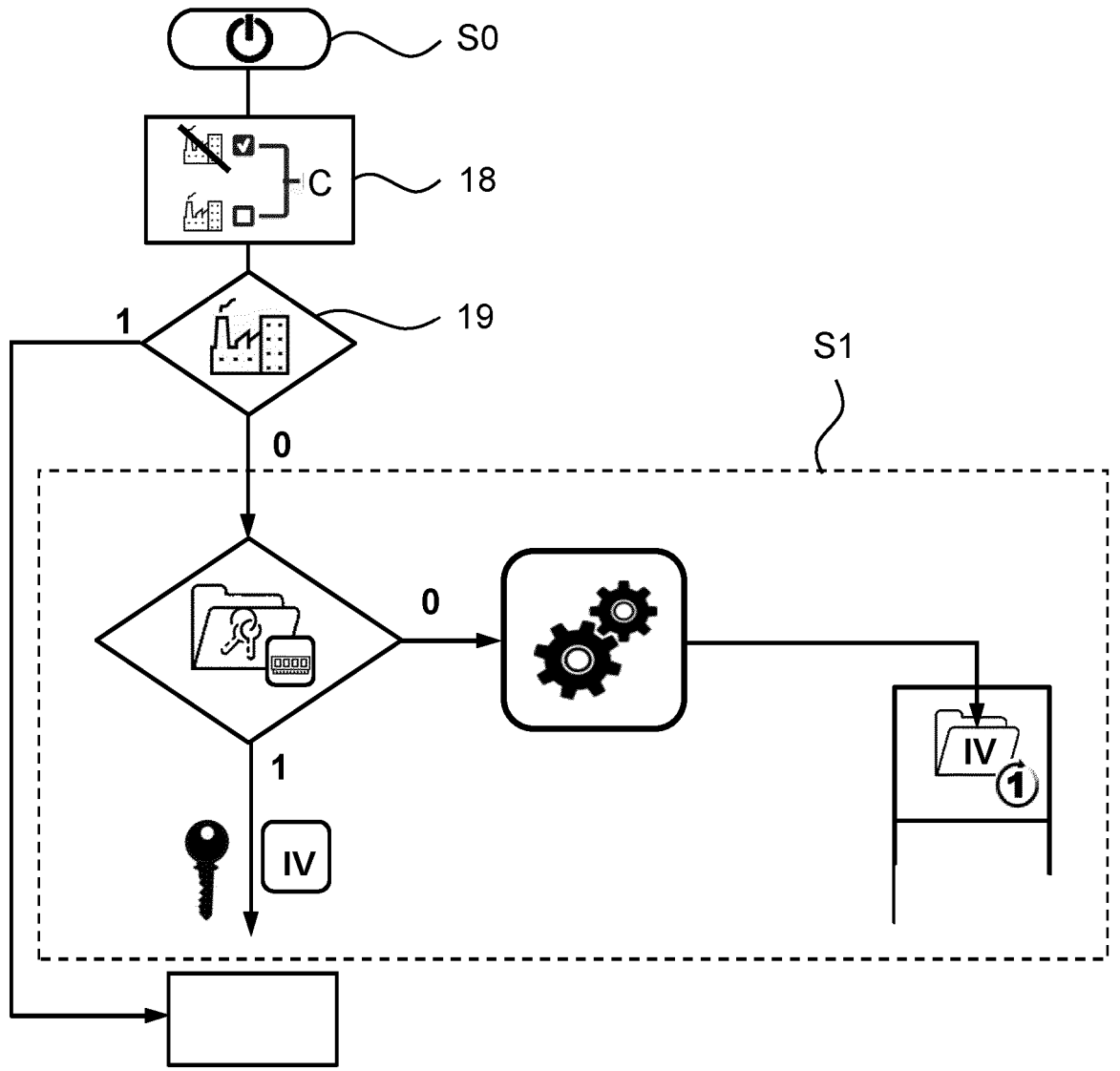
FIG. 6 shows another embodiment in which the first steps of the method further depend on an additional condition.

In order to obviate the issue resulting from such a scenario, the present method is also suggested according to a degraded embodiment that is schematically represented in FIG. 6. In this embodiment the first main step S1 aiming to check the presence of secret data 23 or of the initialization value 27 and, if applicable, generating and storing the initialization value 27 into the OTP area 21, depends on a condition 19 set before the first-ever boot of the secure element 11 or the electronic device 10. Such a condition 19, which may typically be set during the manufacturing process, allows to determine whether the electronic device 10 is intended for a specific company or market. If so, the first main step S1 may be at least skipped. The condition 19, which is tested before the first main step S1, can be determined in advance by a selector 18. As depicted in FIG. 6, the selector 18 can be set for determining whether checking the presence of secret data or of the initialization value and, if applicable, generating and storing the initialization value 27 must be skipped. In other words, the selector 18 can be set for determined whether the electronic device 10 is intended for a specific market or company, e.g. by assigning a related value (e.g. 0 or 1) to a constant that will be tested before the first main step S1. In the example shown in FIG. 6, the constant C set by the selector 18 shows that the electronic device 10 is not intended for a specific market or company since the ticked box correspond to a pictogram showing that the specific company is crossed out. Consequently, the value of the constant C may be equal to 0. Then, the test aiming to determine whether the electronic device 10 is intended for the aforementioned specific market or company is performed before reaching the first main step S1. According to the present example, the condition 19 is not met and the answer provided by the related test is "No", or has a value equal to 0. Therefore, since the electronic device 10 is not intended for the particular market or company that can be predefined using the selector 18, the first main step S1 is executed. On the other hand, if the response to the test relating to the condition 19 is "Yes" or has a value equal to 1, the first main step S1 can be skipped. Given that the aforementioned company or market could be defined, in this case, as needing secret data 23 to be stored in the permanent memory, there is no longer any risk of an initialization value 27 being unintentionally programmed into the memory, especially into the OTP area 21 which cannot be erased and which can be written once only. Accordingly, this embodiment prevents wasting of electronic device 10 in case of potential issue may involuntarily occur during a programming process which would not be based on the use of a scan chain 40.

In a second aspect, the present solution also relates to an electronic device 10 for controlling access to a resource 30 according to any embodiment of the above-mentioned method or any possible combination of its embodiments. As illustrated in FIG. 2, this electronic device 10 comprises at least the secure element 11 linked with a permanent memory 20 having a one-time programmable area 21. The secure element 11 hosts the algorithm 13 and a cryptographic key 15. The latter may be separated from the algorithm or may preferably be embedded, built-in or integrated in the algorithm 13. The electronic device 10, preferably the secure element 11, is configured to:

check the presence of secret data 23, in particular encrypted secret data 23, or of an initialization value 27 in the permanent memory 20 and, in the negative event, generate an initialization value 27 and store this initialization value in the OTP area 21, decrypt the secret data 23, in particular the encrypted secret data 23, by using the signature 22 stored in the permanent memory 20 and, on successful completion, provide access to the resource 30.

Checking the presence of secret data 23 or of the initialization value 27 may be achieved via several manners. For instance, the remaining free space of the permanent memory (more specifically the area dedicated to store the secret data) may be determined, e.g. by comparing it with the capacity of this memory when no data has been stored. As another way, the memory may be scanned to detect stored data, especially stored secret data 23. Alternatively, a register or a parameter acting as a marker within the permanent memory may be set with a predetermined value once data or secret data 23 are stored in the memory. As further example, the written access to the permanent memory may be locked as soon as secret data 23 are stored therein and even if the full capacity of the memory is not reached. As another example, the OTP area 21 may be provided with control bits suitable for indicating whether the area is blank (i.e. is fully free of space), programmed (i.e. already comprises secret data or an initialization value) or locked. Thanks to these control bits, the secure element 11 is able to decide whether it has to generate and store an initialization value into the OTP area 21. These operations, provided here as examples, could be performed by the secure element 11 via a dedicated routine or the algorithm 13.

The operation aiming to generate the initialization value 27 may be performed by the algorithm 13 or by a random generator for example. Such a generator, if any, would preferably be located inside the secure element so as to avoid its physical destruction by a malicious person seeking to prevent the initial value generation. In particular for this reason, the secure element 11 may have a monolithic form factor.

The operation aiming to check the integrity of the secret data 23 may also be performed by the secure element 11, typically using the algorithm 13 or a dedicated routine.

In order to manage these operations, the secure element 11 may be regarded as being at least a central processing unit located in a trusted execution environment. The secure element 11 may take place on a smart card, which in the Pay-TV field, could be read e.g. by a conditional access module (CAM) or any other smart card reader. In such a field, the smart card (also named security module) is responsible for the security of the decryption of descrambling keys and conditional access rights as well as storing user's rights. Therefore, the secure element 11 may be regarded as a very important device since it may be intended to manage highly sensitive data.

As shown in FIG. 2, the electronic device 10 is preferably devoid of any protective hardware, such as the fuse 4 of FIG. 1, able to prevent access to the permanent memory 20 by any means other than the secure element 11.

As disclosed in connection with FIG. 6, the electronic device 10 may also comprise a selector 18 configured to set or to determine, before the first-ever boot of the secure element 11 or the electronic device 10, whether there is a need to check the presence of secret data 23 or of the initialization value 27 and, if applicable, to generate and store the initialization value in the permanent memory 20. The selector 18 can be regarded as an indication (e.g. a value 0 or 1 stored in a constant) notifying the electronic device 10 whether it is intended for a particular market or company when this electronic device 10, or its secure element 11, is start up for the first time. For similar reasons as those mentioned previously, such a selector 18 would preferably be located inside the secure element 11.

According to another preferred embodiment, the electronic device 10 is a system on a chip (SoC), namely an integrated circuit (also known as a chip) that integrates all or most components of a computer or other electronic system. These components typically may include a central processing unit (CPU), a memory (e.g. a temporary memory), input/output ports and a secondary storage. All these components may stand on a single substrate or microchip and may preferably be produced in a monolithic form factor.

It should be noted that any feature or combination of features disclosed in connection with the method (first aspect) may be also part of the electronic device 10 (second aspect), if applicable. Similarly, any feature or combination of features disclosed in connection with the second aspect of the present solution may be also taken into account in the first aspect, if applicable.

FINAL CONSIDERATIONS

Although an overview of the inventive subject matter has been described with reference to specific example embodiments, various modifications and changes may be made to these embodiments without departing from the broader spirit and scope of embodiments of the present invention. For example, various embodiments of features thereof may be mixed and matched or made optional by a person of ordinary skill in the art. Therefore, the Detailed Description is not to be taken in a limiting sense, and the scope of various embodiments is defined only by the appended claims, along with the full range of equivalents to which such claims are entitled.

The invention claimed is:

1. A method for controlling access to a resource in an electronic device, said electronic device comprising a secure element linked with a permanent memory having a one-time programmable area, said method comprising, performed first when the secure element or the electronic device boots:
   checking a presence of at least one of secret data and an initialization value in the permanent memory;
   in a negative event, generating an initialization value and storing the initialization value into the one-time programmable area;
   in a positive event, and when the permanent memory includes secret data, decrypting, within the secure element, the secret data by using an algorithm using a cryptographic key and, when the permanent memory further includes an initialization value, decrypting, within the secure element, the initialization value by using the algorithm using the cryptographic key; and
   checking integrity of the secret data by using a signature stored in the permanent memory and, on successful completion, providing access to the resource.

2. The method of claim 1, wherein at least one of the secret data and the signature is stored in the one-time programmable area.

3. The method of claim 1, wherein the cryptographic key is an obfuscated cryptographic key.

4. The method of claim 1, wherein the cryptographic key is scattered within a source data set or within the algorithm.

5. The method of claim 1, wherein the cryptographic key is a global key integrated into a plurality of electronic devices at a manufacturing stage.

6. The method of claim 5, wherein:
   the secret data is encrypted using a personal key, and
   the method further comprises deriving said personal key from the global key and from the initialization value.

7. The method of claim 1, wherein the algorithm is a proprietary or custom algorithm which is kept secret.

8. The method of claim 1, wherein the initialization value is generated in a random way and/or stored in plain text within the one-time programmable area.

9. The method of claim 1, wherein said secret data is stored during a manufacturing stage of the electronic device.

10. The method of claim 1, wherein the checking of the presence is preceded by testing, by a selector, a condition whether the electronic device is for a specific company or market and, when the electronic device is not for a specific company or market, the checking of the presence is executed.

11. An electronic device for controlling access to a resource, the electronic device comprising:
   circuitry including at least a secure element linked with a permanent memory having a one-time programmable area, wherein the secure element hosts an algorithm with a cryptographic key and is configured to:
      first, when the secure element or the electronic device boots, check a presence of at least one of a secret data and an initialization value in the permanent memory,
      in a negative event, generate an initialization value and store the initialization value in the one-time programmable area,
      in a positive event, and when the permanent memory includes secret data, decrypt the secret data by using said algorithm using the cryptographic key and, when the permanent memory further includes an initialization value, decrypt, within the secure element, the initialization value by using the algorithm using the cryptographic key, and
      check integrity of the secret data by using a signature stored in the permanent memory and, on successful completion, provide access to the resource.

12. The electronic device of claim 11, wherein the electronic device is configured to prevent access to the permanent memory other than by the secure element.

13. The electronic device of claim 11, the circuitry includes a selector configured to determine, before a first-ever boot of the secure element or the electronic device, whether checking the presence of the secret data or of the initialization value and generating and storing the initialization value must be skipped.

14. The electronic device of claim 11, wherein the circuitry constitutes a system on a chip.

15. A method for controlling access to a resource in an electronic device, the electronic device comprising a secure element linked with a permanent memory having a one-time programmable area, the method comprising:
   testing a condition whether the electronic device is for a specific company or market;
   when the electronic device is for the specific company or the market, skipping checking of a presence of at least one of secret data and an initialization value in the permanent memory;
   when the electronic device is not for a specific company or market, checking the presence of the at least one of secret data and the initialization value in the permanent memory;

in a negative event of the checking, generating an initialization value and storing the initialization value into the one-time programmable area;

in a positive event of the checking, and when the permanent memory includes secret data, decrypting, within the secure element, the secret data by using an algorithm using a cryptographic key and, when the permanent memory further includes an initialization value, decrypting, within the secure element, the initialization value by using the algorithm using the cryptographic key; and checking integrity of the secret data by using a signature stored in the permanent memory and, on successful completion, providing access to the resource.

16. The method of claim 15, wherein at least one of the secret data and the signature is stored in the one-time programmable area.

17. The method of claim 15, wherein the cryptographic key is an obfuscated cryptographic key.

18. The method of claim 15, wherein the cryptographic key is scattered within a source data set or within the algorithm.

19. The method of claim 15, wherein the cryptographic key is a global key integrated into a plurality of electronic devices at a manufacturing stage.

20. The method of claim 19, wherein:

the secret data is encrypted using a personal key, and the method further comprises deriving the personal key from the global key and from the initialization value.

* * * * *